(12) United States Patent
Pietsch et al.

(10) Patent No.: US 9,902,872 B2
(45) Date of Patent: Feb. 27, 2018

(54) USE OF AQUEOUS POLYANION-POLYETHYLENEIMINE SOLUTIONS FOR PRODUCING POLYMER FILMS WITH OXYGEN-BARRIER PROPERTIES

(71) Applicant: BASF SE, Ludwigshafen (DE)

(72) Inventors: Ines Pietsch, Speyer (DE); Axel Weiss, Speyer (DE); Peter Preishuber-Pfluegl, Mannheim (DE); Patrick Bippus, Ludwigshafen (DE); Klaus Huenerfauth, Maikammer (DE)

(73) Assignee: BASF SE, Ludwigshafen (DE)

( * ) Notice: Subject to any disclaimer, the term of this patent is extended or adjusted under 35 U.S.C. 154(b) by 493 days.

(21) Appl. No.: 14/398,501

(22) PCT Filed: May 27, 2013

(86) PCT No.: PCT/EP2013/060843
§ 371 (c)(1),
(2) Date: Nov. 3, 2014

(87) PCT Pub. No.: WO2013/182444
PCT Pub. Date: Dec. 12, 2013

(65) Prior Publication Data
US 2015/0086734 A1   Mar. 26, 2015

Related U.S. Application Data

(60) Provisional application No. 61/656,035, filed on Jun. 6, 2012.

(30) Foreign Application Priority Data

Jun. 6, 2012 (EP) .................................... 12171025

(51) Int. Cl.
| C09D 179/02 | (2006.01) |
| C09D 133/02 | (2006.01) |
| C08K 3/28 | (2006.01) |
| C08J 7/04 | (2006.01) |
| C08L 33/02 | (2006.01) |
| C08J 5/18 | (2006.01) |

(52) U.S. Cl.
CPC .............. *C09D 179/02* (2013.01); *C08J 5/18* (2013.01); *C08J 7/047* (2013.01); *C08K 3/28* (2013.01); *C08L 33/02* (2013.01); *C09D 133/02* (2013.01); C08J 2379/02 (2013.01); *Y10T 428/1379* (2015.01); *Y10T 428/264* (2015.01); *Y10T 428/31511* (2015.04); *Y10T 428/31551* (2015.04); *Y10T 428/31678* (2015.04); *Y10T 428/31725* (2015.04); *Y10T 428/31765* (2015.04); *Y10T 428/31786* (2015.04); *Y10T 428/31801* (2015.04); *Y10T 428/31938* (2015.04); *Y10T 428/31993* (2015.04)

(58) Field of Classification Search
CPC combination set(s) only.
See application file for complete search history.

(56) References Cited

U.S. PATENT DOCUMENTS

| 4,902,792 A | 2/1990 | Okuma et al. |
| 7,303,797 B1 * | 12/2007 | Barsotti ..................... C08J 7/04 428/323 |
| 2006/0162882 A1 * | 7/2006 | Ohara ..................... C08F 20/34 162/158 |
| 2008/0213334 A1 | 9/2008 | Lockwood et al. |
| 2011/0143156 A1 * | 6/2011 | Cimpeanu ............ C09D 133/02 428/479.6 |
| 2012/0148836 A1 * | 6/2012 | Cimpeanu .......... C08G 18/0814 428/347 |
| 2012/0148855 A1 | 6/2012 | Cimpeanu et al. |
| 2012/0328870 A1 | 12/2012 | Pietsch et al. |

FOREIGN PATENT DOCUMENTS

| JP | S61-191966 | 8/1986 |
| JP | S61-241337 | 10/1986 |
| JP | H07-247380 | 9/1995 |
| JP | 2013-010857 | 1/2013 |
| JP | 2013-059930 | 4/2013 |
| WO | WO 98/31719 A1 | 7/1998 |
| WO | WO 2007/002322 A1 | 1/2007 |
| WO | WO 2008/042748 A2 | 4/2008 |
| WO | WO 2011/023587 A2 | 3/2011 |
| WO | WO 2012/175433 A1 | 12/2012 |
| WO | WO 2013/182444 A1 | 12/2013 |

OTHER PUBLICATIONS

U.S. Appl. No. 13/526,948, filed Jun. 19, 2012, US2012/0328870 A1, Pietsch, et al.
International Search Report and Written Opinion dated Aug. 28, 2013 in PCT/EP2013/060843.
Office Action (Notification of Reasons for Refusal) dated Jul. 10, 2017 in Japanese Patent Application No. 2015-515469.

* cited by examiner

Primary Examiner — Erma C Cameron
(74) Attorney, Agent, or Firm — Oblon, McClelland, Maier & Neustadt, L.L.P.

(57) ABSTRACT

The use of an aqueous Solution comprising at least one polyanion and at least one high molecular weight polyethyleneimine is described, for providing oxygen barrier properties to a polymer film. The polyanion is a polymer comprising acid groups neutralized with a base selected from the group consisting of inorganic bases and monovalent organic bases and having a weight average molecular weight of at least 10000 g/mol.

8 Claims, No Drawings

USE OF AQUEOUS POLYANION-POLYETHYLENEIMINE SOLUTIONS FOR PRODUCING POLYMER FILMS WITH OXYGEN-BARRIER PROPERTIES

The invention relates to the use of an aqueous solution comprising at least one polymeric polyanion and at least one high molecular weight polyethyleneimine for providing oxygen barrier properties to a polymer film.

When products that are susceptible to oxidation or are sensitive to oxygen are packaged it is important that the packaging materials used have oxygen-barrier properties, i.e. that they have minimum oxygen transmission or minimum oxygen permeability. Polymer films used as packaging materials and made e.g. of polyolefins, such as polyethylene, or of oriented polypropylene, or of polyesters, e.g. polyethylene terephthalate, generally have relatively high oxygen permeability when they are used in uncoated form. Various measures have therefore been proposed for increasing the oxygen-barrier properties of these packaging materials.

WO 07/002322 describes coated polymer films with oxygen-barrier properties. The coating composition is a solution of a maleic acid/acrylic acid copolymer and of a vinyl alcohol/vinylamine copolymer. After the coating process, the two copolymers of the coating composition crosslink on the polymer film.

WO 98/31719 describes coating compositions for barrier coatings. The compositions comprise an ethylenically unsaturated acid monomer and a polyamine, comprising an incorporated crosslinking agent. After the coating process, crosslinking takes place via initiation of a free-radical-induced polymerization reaction.

WO 2011/023587 describes the use of specific polyelectrolyte complexes for providing an oxygen barrier to packaging materials made of polymer films. The polymer film is either coated with an aqueous dispersion comprising a dispersed polyelectrolyte complex previously produced by water-in-water emulsion polymerization, or the polymer film is coated with a composition comprising a polyelectrolyte complex produced from anionic polymer and from cationic surfactant, or the polymer film is coated with at least three alternating layers, where respectively one of two adjacent layers comprises an anionic polyelectrolyte component and the other of two adjacent layers comprises a cationic polyelectrolyte component, and polyelectrolyte complexes form at the opposite, adjacent interfaces of the alternating layers. Packaging films known hitherto with oxygen-barrier properties are not yet entirely satisfactory, especially when used in high humidity atmosphere. For example the barrier coating described in WO 2011/023587 needs an additional moisture-protection system for protecting the barrier from humidity.

It was an object of the present invention to provide further compositions and processes which permit production of polymer films with good oxygen-barrier properties, in particular good oxygen-barrier properties in high humidity environments without the need for additional protective coatings.

The invention provides the use of an aqueous solution comprising at least one polyanion and at least one polyethyleneimine for providing oxygen barrier properties to a polymer film, wherein the polyanion is a polymer comprising acid groups neutralized with at least one base selected from the group consisting of inorganic bases and monovalent organic bases and said polymer comprising acid groups having a weight average molecular weight of at least 10000 g/mol prior to neutralization;

and wherein said polyethyleneimine has a weight average molecular weight of at least 25000 g/mol.

The invention also provides a coated polymer film comprising an oxygen barrier coating obtainable via the use according to the invention as described herein, wherein at least one side of the polymer film has been coated with an aqueous solution comprising at least one polyanion and at least one polyethyleneimine, wherein the polyanion is a polymer comprising acid groups neutralized with at least one monovalent base and said polymer comprising acid groups having a weight average molecular weight of at least 10000 g/mol prior to neutralization;

and wherein said polyethyleneimine has a weight average molecular weight of at least 25000 g/mol. The molecular weight can be determined by gel permeation chromatography or light scattering.

The coating produced according to the invention using the aqueous solution of polymers has oxygen-barrier properties. The barrier properties can be measured by the permeability test described in the examples. The term oxygen-barrier property means that oxygen transmission rate (OTR) has been reduced in comparison with an uncoated substrate. The oxygen transmission rate of polymer films coated according to the invention is preferably less than 20%, in particular less than 10%, or less than 5%, e.g. from 1 to 3%, of the value for the uncoated polymer film measured at 23° C. and 0% relative humidity; and preferably less than 30% or less than 20% or less than 10% measured at 23° C. and 85% relative humidity.

The aqueous solution of polymers contains preferably from 10 to 90 wt. %, more preferably from 20 to 80 wt. % of the polyanion, referring to solids content.

The aqueous solution of polymers contains preferably from 10 to 90 wt. %, more preferably from 20 to 80 wt. % of the polyethyleneimine, referring to solids content.

The weight ratio of the polyanion (calculated without neutralizing agent) to the polyethyleneimine is preferably from 10:1 to 10:9, more preferably from from 10:2 to 10:5 or from 10:3 to 10:4.

The concentration of the sum of polyanion and polyethyleneimine in the aqueous solution, is preferably at least 1% by weight, in particular at least 5% by weight and up to 50% by weight or up to 60% by weight, for example from 1 to 50% by weight or from 5 to 40% by weight.

The amount of polyethylene imine used to produce the aqueous solution is preferably selected in such a way that, per mole of the amino groups of the polyethylene imine the amount of anionic groups of the at least one anionic polymer is, for example, up to 400 mol %, or up to 250 mol %, preferably from 150 to 380 mol %, or from 180 to 250 mol %.

The polyanion is a polymer comprising neutralized acid groups, also named anionic polymer. Anionic polymers are polymers having anionic or acidic groups, in particular organic polymers having carboxylate, phosphate, or sulfate groups or the corresponding acid groups. The term "anionic polymer" also comprises the corresponding polymers with acid groups, as long as they are at least partially neutralized by monovalent bases when used in the aqueous solution according to the invention.

Examples of suitable anionic polymers are those formed by free-radical polymerization of ethylenically unsaturated anionic monomers capable of free-radical polymerization.

The term "anionic monomer" comprises monomers with at least one anionic or acidic group, wherein the acidic group can be neutralized by a base. The group of anionic polymers also comprises copolymers made of at least one anionic monomer and of one or more than one different non-ionic, non-acidic copolymerizable monomer(s). The polyanion can also be synthesized by polymerization of one or more non-ionic monomers such as acid derivatives like for example ethylenically unsaturated acid esters, followed by a hydrolysis to obtain an anionic polymer. Suitable non-ionic monomers can be alkyl acrylates, alkyl methacrylates (e.g. tert-butyl acrylate, ethyl acrylate etc.) or ethylenically unsaturated acid anhydrids such as maleic anhydride.

Examples of ethylenically unsaturated anionic monomers that can be used are monoethylenically unsaturated $C_3$ to $C_{10}$ or $C_3$ to $C_5$ carboxylic acids, such as acrylic acid, methacrylic acid, ethacrylic acid, crotonic acid, maleic acid, fumaric acid, vinylsulfonic acid, styrenesulfonic acid, acrylamidomethylpropanesulfonic acid, vinylphosphonic acid, itaconic acid, and salts of these acids such as the alkali-metal salts, alkaline-earth-metal salts, or ammonium salts of these acids. Among the anionic monomers preferably used are acrylic acid, methacrylic acid, maleic acid, and 2-acrylamido-2-methylpropanesulfonic acid. Particular preference is given to aqueous solutions of polymers based on acrylic acid. The anionic monomers can either be polymerized alone to give homopolymers or else can be polymerized in a mixture with one another to give copolymers. Examples of these are the homopolymers of acrylic acid, homopolymers of methacrylic acid, copolymers of acrylic acid and maleic acid, copolymers of acrylic acid and methacrylic acid, and copolymers of methacrylic acid and maleic acid. Preferably, the polyanion is selected from polymers capable of being produced from monomers selected from the group consisting of monoethylenically unsaturated $C_3$ to $C_{10}$ carboxylic acids, vinylsulfonic acid, styrenesulfonic acid, acrylamidomethylpropanesulfonic acid, vinylphosphonic acid, and salts of these acids, preferably acrylic acid, methacrylic acid, maleic acid, itaconic acid. Most preferably the polyanion is a polyacrylic acid or a copolymer of acrylic acid and maleic acid.

However, the anionic monomers can also be polymerized in the presence of at least one other ethylenically unsaturated monomer. These monomers can be nonionic or can bear a cationic charge. Examples of nonionic comonomers are acrylamide, methacrylamide, N—$C_1$ to $C_3$-alkylacrylamides, N-vinylformamide, acrylic esters of monohydric alcohols having from 1 to 20 carbon atoms, e.g. in particular methyl acrylate, ethyl acrylate, isobutyl acrylate, and n-butyl acrylate, methacrylic esters of monohydric alcohols having from 1 to 20 carbon atoms, e.g. methyl methacrylate and ethyl methacrylate, and also vinyl acetate and vinyl propionate.

Suitable cationic monomers which can be copolymerized with the anionic monomers are dialkylaminoethyl acrylates, dialkylaminoethyl methacrylates, dialkylaminopropyl acrylates, dialkylaminopropyl methacrylates, dialkylaminoethylacrylamides, dialkylaminoethylmethacrylamides, dialkylaminopropylacrylamides, dialkylaminopropylmethacrylamides, diallyldimethylammonium chloride, vinylimidazole, and also the respective basic monomers neutralized with acids and/or quaternized. Individual examples of cationic monomers are dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, and diethylaminopropyl methacrylate, dimethylaminoethylacrylamide, dimethylaminoethylmethacrylamide, dimethylaminopropylacrylamide, dimethylaminopropylmethacrylamide, diethylaminoethylacrylamid, and diethylaminopropylacrylamide.

The basic monomers can have been completely or only to some extent neutralized or quaternized, for example to an extent of from 1 to 99% in each case. Preferred quaternizing agent used for the basic monomers is dimethyl sulfate. However, the monomers can also be quaternized with diethyl sulfate or with alkyl halides, such as methyl chloride, ethyl chloride, or benzyl chloride. The amount used of the cationic monomers is at most such that the resultant polymer bears a net charge which is anionic at pH<6.0 and a temperature of 20° C. The excess of anionic charge in the resultant amphoteric polymers is, for example, at least 5 mol %, preferably at least 10 mol %.

The amounts of the non-anionic, non-acidic comonomers used in the production of the anionic polymers are such that the resultant polymers are water-soluble when diluted with water at pH above 7.0 and at a temperature of 20° C., and have an anionic net charge. Examples of the amount of non-anionic, non-acidic comonomers, based on the total amount of monomers used in the polymerization reaction, are from 0 to 99% by weight, preferably from 1 to 75% by weight, and mostly an amount in the range from 1 to 25% by weight.

Examples of preferred copolymers are copolymers made of from 25 to 90% by weight of acrylic acid and from 75 to 10% by weight of acrylamide. It is preferable to polymerize at least one ethylenically unsaturated $C_3$ to $C_5$ carboxylic acid in the absence of other monoethylenically unsaturated monomers. Particular preference is given to homopolymers of acrylic acid, obtainable via free-radical polymerization of acrylic acid in the absence of other monomers; or to copolymers of acrylic acid and maleic acid.

In one embodiment, the anionic polymer comprises 2-acrylamido-2-methylpropanesulfonic acid (AMPS). It is preferable to copolymerize acrylic acid with AMPS. The amount of AMPS here can be, for example, from 0.1 to 15 mol % or from 0.5 to 10 mol %, based on the amount of all of the monomers.

The polymerization reaction for making the anionic polymer can also be conducted in the presence of at least one crosslinking agent. This then gives copolymers with higher molar mass than when the anionic monomers are polymerized in the absence of any crosslinking agent. Crosslinking agents used can comprise any of the compounds that have at least two ethylenically unsaturated double bonds within the molecule. Examples of crosslinking agents are triallylamine, the triallyl ether of pentaerythritol, the tetraallyl ether of pentaerythritol, methylenebisacrylamide, N,N'-divinylethyleneurea, allyl ethers comprising at least two allyl groups, or vinyl ethers having at least two vinyl groups, where these ethers derive from polyhydric alcohols, e.g. sorbitol, 1,2-ethanediol, 1,4-butanediol, trimethylolpropane, glycerol, diethylene glycol, and from sugars, such as sucrose, glucose, mannose; other examples are dihydric alcohols which have from 2 to 4 carbon atoms and which have been completely esterified with acrylic acid or with methacrylic acid, e.g. ethylene glycol dimethacrylate, ethylene glycol diacrylate, butanediol dimethacrylate, butanediol diacrylate, diacrylates or dimethacrylates of polyethylene glycols with molecular weights from 300 to 600, ethoxylated trimethylenepropane triacrylates or ethoxylated trimethylenepropane trimethacrylates, 2,2-bis(hydroxymethyl)butanol trimethacrylate, pentaerythritol triacrylate, pentaerythritol tetraacrylate, and triallylmethylammonium chloride. If crosslinking agents are used in the production of the solutions of the invention, examples of the respective amounts used of crosslinking agent are from 0.0005 to 5.0% by weight, preferably from 0.001 to 1.0% by weight, based on the entirety of monomers used in the polymerization reaction, provided that the polymer remains water-soluble at pH>7. Crosslinking agents preferably used are the triallyl ether of pentaerythritol, the tetra allyl ether of pentaerythritol, N,N"-divinylethylene urea, allyl ethers of sugars such as sucrose, glucose or mannose, where these ethers comprise at least two allyl groups, and triallylamine, and also mixtures of these compounds.

If at least one anionic monomer is polymerized in the presence of at least one crosslinking agent, it is preferable to produce crosslinked copolymers of acrylic acid and/or methacrylic acid by polymerizing acrylic acid and/or methacrylic acid in the presence of the triallyl ether of pentaerythritol, the tetraallyl ether of pentaerythritol, N,N"-divinylethyleneurea, allyl ethers of sugars such as sucrose, glucose or mannose, where these ethers comprise at least two allyl groups, and triallylamine, and also mixture es of these compounds. Preferably the amounts of crosslinking agents used in the polymerization reaction are limited to an extent so that the resultant anionic polymers are soluble in aqueous solution at pH>7.0.

The weight average molecular weight of the polymer comprising acid groups prior to neutralization is at least 10000 g/mol, more preferably at least 30000 g/mol, for example from 10000 to 200000 g/mol or from 30000 to 150000 g/mol.

The acid groups of the polyanion are partially or completely neutralized with at least one base selected from the group consisting of inorganic bases and monovalent organic bases base. A monovalent organic base is an organic compound with a single basic group, e.g. a single amino group. Bases are for example NaOH, KOH, $Ca(OH)_2$, $Ba(OH)_2$, sodium carbonate, potassium carbonate, trisodium phosphate, ammonia or primary, secondary or tertiary organic amines. Preferred bases are ammonia, sodium hydroxide and triethanol amine. Most preferred are volatile bases such as ammonia.

The degree of neutralization of the polyanion is preferably from 30 to 100%, more preferably from 50 to 100%, based on the total molar amount of acidic groups of the anionic polymer.

The aqueous solution comprises at least on polyethyleneimine. Polyethyleneimines are polymers comprising ethyleneimine units. They are preferably branched. The polyethyleneimines can be used neutralized in the form of the salts with suitable acids but are preferably used in unneutralized form.

In one embodiment of the invention, the polyethyleneimine is selected from highly branched or dendritic polyethyleneimines. Highly branched polyethyleneimines are characterized by their high degree of branching (DB). The DB can be determined by $^{13}$C-NMR-spectroscopy, preferably in $D_2O$, and is defined as:

$$DB=D+T/(D+T+L)$$

wherein D (dendritic) correlates to the amount of tertiary amine groups, L (linear) correlates to the amount of secondary amine groups and T (terminal) correlates to the amount of primary amine groups. Highly branched polyethyleneimines according to the invention have a DB of preferably from 0.1 to 0.95, or from 0.25 to 0.9, more preferred from 0.30 to 0.80 and especially preferred of at least 0.5.

Dendritic polyethyleneimines have a structural and molecular uniform constitution (DB=1).

The weight average molecular weight of the polyethylene imines is at least 25000 g/mol, more preferably at least 10000 g/mol, for example from 25000 to 3 million g/mol or from 100000 to 2 million g/mol. The charge density of the polyethylene imines is preferably from 1 to 35 meq/g, more preferably from 5 to 25 meq/g. Charge density can be measured by titration of aqueous solutions of the polyethyleneimine with potassium polyvinyl sulfate (KPVS) at pH 4.5 with toluidine blue as indicator.

Suitable cationic polymers are polymers of ethyleneimine which are produced via polymerization of ethyleneimine in an aqueous medium in the presence of small amounts of acids or of acid-forming compounds, examples being halogenated hydrocarbons, e.g. chloroform, carbon tetrachloride, tetrachloroethane, or ethyl chloride, or are condensates of epichlorohydrin and compounds comprising amino groups, examples being mono- and polyamines, e.g. dimethylamine, diethylamine, ethylenediamine, diethylenetriamine, and triethylenetetramine, or ammonia. By way of example, they have molecular weights $M_w$ of from 25000 to 3 million, preferably from 100000 to 2 million g/mol.

This group of cationic polymers also includes graft polymers of ethyleneimine on compounds having a primary or secondary amino group, examples being polyamidoamines made of dicarboxylic acids and of polyamines. The ethyleneimine-grafted polyamidoamines can also, if appropriate, be reacted with bifunctional crosslinking agents, for example with epichlorohydrin or with bischlorohydrin ethers of polyalkylene glycols.

In one embodiment, the polyethyleneimine is crosslinked. Any crosslinking agent with at least two functional groups capable of forming covalent bonds with amine groups of the polyethyleneimine can be used for crosslinking. Suitable crosslinking agents are for example alkyldialdehyds with preferably 3 to 20 C-atoms such as glutaraldehyd (1,5-pentanedial).

The aqueous solution may comprise water as the only solvent or it may comprise a mixture of water and water miscible organic solvents such as methanol, ethanol, acetone or tetrahydrofuran. Preferably water is the only solvent. The pH is preferably from 6 to 12, more preferably from 7 to 10.

One embodiment of the invention is a polymer film comprising an oxygen barrier coating obtainable via the use of an aqueous polymer solution as described above, wherein at least one side of the polymer film has been coated with an aqueous solution comprising at least one polyanion and at least one polyethyleneimine, wherein the polyanion is a polymer comprising acid groups neutralized with at least one monovalent base and said polymer comprising acid groups having a weight average molecular weight of at least 10000 g/mol prior to neutralization;

and wherein said polyethyleneimine has a weight average molecular weight of at least 25000 g/mol.

The aqueous polymer solutions used for the coating process can comprise further additives or auxiliaries, e.g. thickeners for adjusting rheology, wetting aids, or binders. Preferred polymer film substrates are polymer films which are suitable for packaging.

Preferred polymer films are made of oriented polypropylene or polyethylene, where the polyethylene can have been produced from ethylene either by the high-pressure polymerization process or by the low-pressure polymerization process. Examples of other suitable polymer films are made of polyester, such as polyethylene terephthalate, and films made of polyamide, polystyrene and polyvinyl chloride. In one embodiment, the polymer film is biodegradable, e.g. made of biodegradable aliphatic-aromatic copolyesters and/or polylactic acid, an example being Ecoflex® films or Ecovio® films. Examples of suitable copolyesters are those formed from alkanediols, in particular C2 to C8 alkanediols, e.g. 1,4-butanediol, and from aliphatic dicarboxylic acids, in particular C2 to C8 dicarboxylic acids, e.g. adipic acid, and from aromatic dicarboxylic acids, e.g. terephthalic acid. Preferred polymer film materials are selected from polyethylene terephthalate, oriented polypropylene, casted polypropylene, polyethylene, biodegradable aliphatic-aromatic copolyesters, metalized polyethylene terephthalate, metalized oriented polypropylene and polyamide.

The thickness of the polymer film can be in the range from 5 to 200 µm, in the case of films made of polyamide from 5 to 50 µm, in the case of films made of polyethylene terephthalate from 10 to 100 µm, in case of oriented polypropylene form 10 to 100 µm, in the case of films of polyvinyl chloride about 100 µm, and in the case of films made of polystyrene about 30-75 µm.

Preferably, the oxygen barrier coating on the polymer film is pore-free, which can be analyzed by atomic force microscopy (AFM) or scanning electron microscope (SEM).

One embodiment of the invention is a method of forming a polymeric film with enhanced oxygen barrier properties comprising:
applying an aqueous solution to at least one side of the polymer film,
the aqueous solution comprising at least one polyanion and at least one polyethyleneimine,
wherein the polyanion is a polymer comprising acid groups neutralized with at least one monovalent base and said polymer comprising acid groups having a weight average molecular weight of at least 10000 g/mol prior to neutralization;
and wherein said polyethyleneimine has a weight average molecular weight of at least 25000 g/mol.

The aqueous coating composition can be applied by typical coating machinery to a backing film made of a plastic. If materials in the form of webs are used, the aqueous polymer solution is usually applied from a trough by way of an applicator roll and rendered uniform with the aid of an air knife. Other suitable possibilities for applying the coating use the reverse gravure process, or spray processes, or a spreader system that uses a roll, or other coating processes known to the person skilled in the art.

The aqueous coating can also be applied in a multi-coating process, wherein a first coating is followed by a second or more coating.

Other suitable coating processes are the known intaglio printing and relief printing processes. Instead of using different inks in the printing-ink units, the process here by way of example uses a printing process for application of the aqueous polymer solution. Printing processes that may be mentioned are the flexographic printing process as a relief printing process known to the person skilled in the art, the gravure process as an example of intaglio printing, and offset printing as an example of flatbed printing. Modern digital printing, inkjet printing, electrophotography and direct imaging can also be used.

In order to achieve a further improvement in adhesion on a polymer film, the backing film can be previously subjected to corona treatment. Examples of the amounts applied to the sheet materials are preferably from 0.2 to 50 g (polymer, solid) per m², preferably from 0.5 to 20 g/m² or from 1 to 15 g/m².

In order to achieve a further improvement in adhesion on a polymer film, a pre-coating or a primer can be applied on the polymer film before coating the oxygen barrier onto the substrate. Such primers can be based on polyurethane dispersions, polyurethane solutions, solvent-free or solvent based reactive polyurethane, polyethylene imine, polyacrylates or other primers known to the person skilled in the art.

Once the aqueous coating composition has been applied to the sheet substrates, the solvent is evaporated. For this, by way of example, in the case of continuous operation, the material can be passed through a drying tunnel, which can have an infrared irradiation apparatus. The coated and dried material is then passed over a cooling roll and finally wound up. The thickness of the dried coating is preferably from 0.2 to 50 µm, particularly preferably from 0.5 to 20 µm, most preferred from 1-15 µm.

The substrates coated with the aqueous coating composition exhibit excellent oxygen-barrier action, in particular in high humidity environments. The coated substrates can be used for example as means of packaging, preferably for packaging foods. The coatings have very good mechanical properties and exhibit, for example, good behavior in relation to blocking and in essence no cracking.

The oxygen barrier coating can also be used as a barrier coating against other substances. Such substances can be carbon dioxide, nitrogen, bisphenol A (BPA), mineral oil, fat, aldehydes, grease, plasticizer, photoinitiators or aroma substances.

In order to obtain specific additional surface properties or specific coating properties of the coated polymer films, for example good printability, or further improved sealing and non-blocking properties, or good water-resistance, it can be advantageous to overcoat the coated substrates with topcoat layers which provide these desired additional properties. The substrates precoated with the aqueous coating composition according to the invention can readily be over-coated. For the overcoating process, one of the processes mentioned above can be repeated, or repeated coating can be carried out in a continuous process without any intervening wind-up and unwind of the foil. The location of the oxygen barrier layer can thus be in the interior of the system, and the surface properties are then determined by the topcoat layer. The topcoat layer has good adhesion to the oxygen-barrier layer. Due to the good humidity resistance, it is in particular not necessary to apply an additional moisture-protection coating to ensure that the oxygen-barrier layer is effective even at relatively high humidity levels.

In one embodiment, a polymer film of the invention comprises in addition to the oxygen barrier coating at least one additional layer made from materials selected from the group consisting of polyacrylates, polyvinylidene chloride (PVDC), waxes, epoxy resins, UV curable acrylates and polyurethanes.

In one embodiment of the invention a polymer film of the invention as described above is laminated with at least one additional material wherein the at least one additional material is selected from polyethylene terephthalate, oriented polypropylene, polyethylene, casted polypropylene, biodegradable aliphatic-aromatic copolyesters, metalized polyethylene terephthalate, metalized oriented polypropylene, polyamide, paper and board.

Another embodiment of the invention is a package comprising a polymer film according to the invention as described above.

EXAMPLES

Measurement of Oxygen-Barrier Action:

Oxygen transmission is determined on coatings on polymer films at a relative humidity (RH) level of 85%. Measurements are done with 100% oxygen gas at a temperature of 23° C.

Carrier material: polymer film of boPP (biaxial oriented polypropylene) with a thickness of 40 μm.

Oxygen transmission rate of the uncoated film at 85% RH/23° C.: about 975 cm$^3$/(m$^2$*d).

The determination method is based on ASTM D3985, using a coulometric sensor. Each sample is measured twice and the mean result is calculated.

The transmission of a multi-layer system is calculated according to the equation $$\frac{1}{TR_{total}} = \frac{1}{TR_A} + \frac{1}{TR_B} + \cdots$$

wherein TR$_{total}$ is the oxygen transmission of the multi-layer film and TR$_A$ and TR$_B$ are the oxygen transmissions of layer A and layer B, respectively.

Polymer Samples:

PEI1 aqueous solution of polyethyleneimine, Mw=750000 g/mol;

charge density 17 meq/g, pH=11

PEI2 aqueous solution of polyethyleneimine, Mw=1300 g/mol;

charge density 16 meq/g, pH=11

PVA aqueous solution of polyvinylamine, Mw=340000 g/mol;

charge density 13 meq/g, pH=7-9

PAS1 copolymer of polyacrylic acid and maleic acid (75:25), Mw=80000 g/mol

PAS2 polyacrylic acid, Mw=3000 g/mol

Samples PAS1 and PAS2 are pre-neutralized with ammonia before combining with the polyethylene imine or polyvinylamine.

The boPP-Film is coated with either a single solutions of polymers according to table 1 for generating a single layer (examples 2-6) or with 4 solutions for generating a 4-layer film (example 1). The compositions and results are summarized in table 1.

TABLE 1 oxygen transmission rate measurement results; amounts in parts by weight

| Example | Composition | Layer thickness [μm] | Oxygen transmission rate (85% RH) [cm$^3$/(m$^2$ * d)] |
|---|---|---|---|
| 1 (comparative) | Layer structure:<br>1) PEI1<br>2) PAS1 (+NH3)<br>3) PEI1<br>4) PAS1 (+NH3) | about 10 | 421 |
| 2 | 100 PAS1<br>25 NH3<br>40 PEI1 | 4 | 32 |
| 3 (comparative) | 100 PAS1<br>25 NH3<br>40 PVA | 2 | 950 |
| 4 (comparative) | 100 PAS1<br>25 NH3<br>40 PEI2 | 8 | 227 |
| 5 (comparative) | 100 PAS2<br>25 NH3<br>40 PEI1 | 5 | 529 |
| 6 (comparative) | 100 PAS2<br>25 NH3<br>40 PEI2 | 4 | 540 |

The data show that example 2 according to the invention shows the best oxygen barrier properties at high humidity.

The invention claimed is:

1. A method of providing oxygen barrier properties to a polymer film, comprising:
   applying an aqueous solution to at least one side of the polymer film, the aqueous solution comprising a polyanion and a polyethylenimine;
   wherein
   the polyanion is a polymer comprising acid groups neutralized with at least one base selected from the group consisting of inorganic bases and monovalent organic bases and a weight average molecular weight of the polyanion polymer is at least 10000 g/mol prior to neutralization of the acid groups; and
   a weight average molecular weight of the polyethyleneimine is at least 25000 g/mol, and
   wherein the polyanion is selected from polymers obtained by polymerization of at least one monomers selected from the group consisting of monoethylenically unsaturated C$_3$ to C$_{10}$ carboxylic acids, vinylsulfonic acid, acrylamidomethylpropanesulfonic acid, vinylphosphonic acid, and salts of these acids.

2. The method according to claim 1, wherein the aqueous solution comprises:
   (a) from 10 to 90 wt. %, referring to solids content, of the polyanion and
   (b) from 10 to 90 wt. %, referring to solids content, of the polyethyleneimine.

3. The method according to claim 1, wherein a weight ratio of the polyanion, calculated without neutralizing agent, to the polyethyleneimine is from 10:2 to 10:5.

4. The method according to claim 1, wherein the weight average molecular weight of the polymer comprising acid groups is from 10,000 to 200,000 g/mol.

5. The method according to claim 1, wherein the polyethyleneimine is branched, and the weight average molecular weight of the polyethyleneimine is from 25000 to 3 million g/mol and the charge density of the polyethyleneimine is from 1 to 35 meq/g.

6. The method according to claim 1, wherein a degree of neutralization of the polyanion is from 30 to 100% and wherein the pH of the aqueous solution is from 6 to 12.

7. The method according to claim 1, wherein the base is selected from the group consisting of ammonia, sodium hydroxide and triethanol amine.

8. A method of forming a polymeric film with enhanced oxygen barrier properties comprising:
   applying an aqueous solution to at least one side of the polymer film, the aqueous solution comprising: a polyanion and a polyethyleneimine,
   wherein the polyanion is a polymer comprising acid groups neutralized with at least one base selected from the group consisting of inorganic bases and monovalent organic bases and a weight average molecular weight of the polyanion polymer is at least 10000 g/mol prior to neutralization of the acid groups; and a weight average molecular weight of the polyethyleneimine is at least 25000 g/mol.

* * * * *